BEAM CENTERING AND DEFLECTION CORRECTION
MEANS FOR CATHODE RAY TUBES

Filed Nov. 20, 1957 2 Sheets-Sheet 1

INVENTORS
ROY S. FISHER
CHARLES F. OTIS
HENRY S. VASILEVSKIS
BY Robert D. Sanborn
ATTORNEY Dec. 6, 1960 R. S. FISHER ET AL 2,963,609

BEAM CENTERING AND DEFLECTION CORRECTION MEANS FOR CATHODE RAY TUBES

Filed Nov. 20, 1957 2 Sheets-Sheet 2

INVENTORS
ROY S. FISHER
CHARLES F. OTIS
HENRY S. VASILEVSKIS

BY Robert D. Sanborn
ATTORNEY

United States Patent Office 2,963,609

Patented Dec. 6, 1960

2,963,609

BEAM CENTERING AND DEFLECTION CORRECTION MEANS FOR CATHODE RAY TUBES

Roy S. Fisher, Philadelphia, Charles F. Otis, Roslyn, and Henry S. Vasilevskis, Ardsley, Pa., assignors to Philco Corporation, Philadelphia, Pa., a corporation of Pennsylvania Filed Nov. 20, 1957, Ser. No. 697,723

7 Claims. (Cl. 313—84)

The present invention relates to cathode ray tube display systems and more particularly to novel beam centering and deflection correction means for such display systems.

Cathode ray tubes are generally designed so that, ideally, the undeflected electron beam strikes the geometrical center of the screen. In practice, however, due to minor variations in manufacture of the tube itself and in the deflection yoke associated therewith, it is found that the undeflected position of the spot may be displaced by a small but noticeable amount from the geometrical center of the tube. As a result, the image formed by the display system will not be centered on the screen of the cathode ray tube. Even a relatively small offcentering of the picture is considered to be highly objectionable in commercial television receivers. Therefore it is necessary to provide means for correcting for these small but objectionable centering errors which occur during manufacture as well as for other slight errors in centering which may occur as the display system is used by the customer.

It has been the practice in the past to employ permanent magnet centering devices on the neck of the cathode ray tube for centering the beam. Formerly such centering devices were customarily located on the neck of the cathode ray tube just to the rear of the deflection yoke.

The present trend in monochrome television receiver design is to make the over-all length of the cathode ray tube as short as possible in order that the front-to-back dimension of the television cabinet may be made as small as possible. As a direct result of this trend the neck of certain types of cathode ray tubes has been shortened to the point where it is no longer practical to place the centering device on the neck of the cathode ray tube itself. Therefore it becomes necessary to superimpose the beam centering device on the deflection yoke.

Beam centering devices for use on the deflection yoke itself have been proposed in the past. Some of the prior art devices require a portion of the yoke core to be removed to accommodate the centering device. Other centering devices require more or less elaborate pole pieces and two or more magnets. Many of the prior art centering devices are formed of several separate parts which makes the device difficult to assemble in the factory. The prior art devices normally require spacers of non-magnetic material which must be formed so as to separate the centering device from the yoke core. All of these factors make the prior art centering devices difficult and expensive to construct. The centering devices of the prior art suffer from the further disadvantage that, in general, they function solely as beam centering devices and contribute nothing to improvements in other circuit characteristics such as sweep linearity.

Therefore it is an object of the present invention to provide a novel, inexpensive beam centering device for use with a cathode ray tube image display system.

Still another object of the invention is to provide a novel beam centering device for use with cathode ray tube image display systems which is also useful in improving the sweep linearity of such systems.

A further object of the present invention is to provide a novel beam centering device for the use mentioned which has a minimum number of parts to be assembled.

For a better understanding of the present invention together with other and further objects thereof reference should now be made to the following detailed description which is to be read in conjunction with the accompanying drawings in which.

Figure 1:
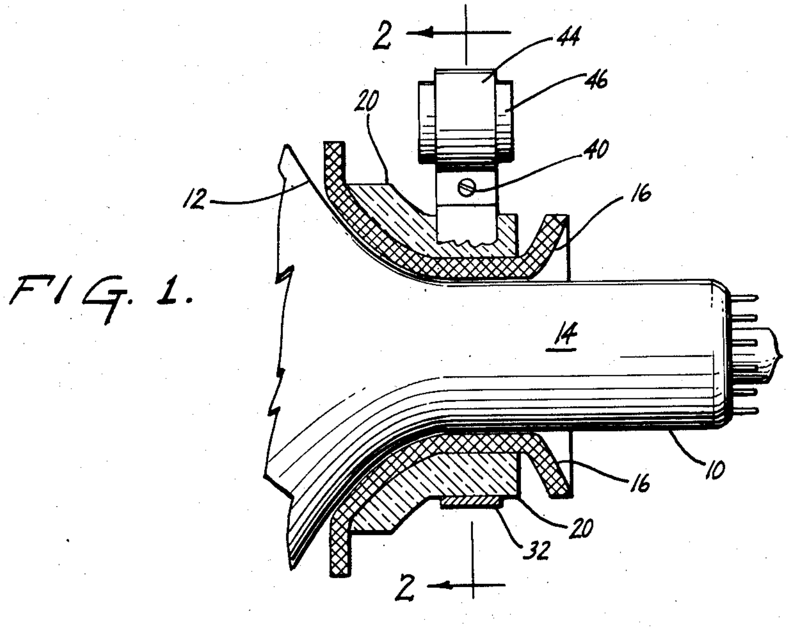
Fig. 1 is an elevational view partly in section of a preferred embodiment of the present invention.

In Fig. 1 the neck portion 10 and neck flare 12 of a cathode ray tube 14 are shown as viewed from above. Mounted on neck 10 adjacent neck flare 12 are the deflection coils shown schematically in section at 16 in Fig. 1. As shown more clearly in Fig. 2, the numeral 16 represents four saddle shaped coils **16*a*–16*d* which are spaced in quadrature about neck 10. These deflection coils 16*a*–16*d* are energized in pairs to generate the horizontal and vertical deflection fields which result in the formation of a raster on the screen of cathode ray tube 14**.

Surrounding coils 16 is the yoke core 20, the normal function of which is to provide a low reluctance return path for the flux set up across neck 10 by the deflection coils 16. Again core 20 has been shown in section in Fig. 1. Core 20 preferably has a high permeability, low residual magnetization and low eddy current losses.

As will be explained in more detail presently, core 20 is divided into two semi-cylindrical segments **20*a* and 20*b*. It is generally necessary, even in prior art devices, to form core 20 of two parts so that it may be closely fitted about the central region of saddle shaped deflection coils 16 after these coils have been formed. It has been the practice in the prior art to clamp the two segments 20*a* and 20*b* tightly together thereby to form a substantially continuous ring without any appreciable air gaps. We have found it to be advantageous, however, to insert non-magnetic shim members 28 and 30 between the ends of segments 20*a* and 20*b*. The thickness of shim members 28 and 30** is typically of the order of five thousandths to ten thousandths of an inch.

Surrounding core 20 is a band 32 which functions both as a clamping band for the two core segments **20*a* and 20*b* and as the pole pieces for the centering device which is about to be described. Band 32 is preferably made of low reluctance magnetic material, for example cold rolled steel, and, contrary to the teachings of the prior art, may be placed in direct contact with core 20 and may be continuous across the gap formed by shim 28**.

Figure 2:
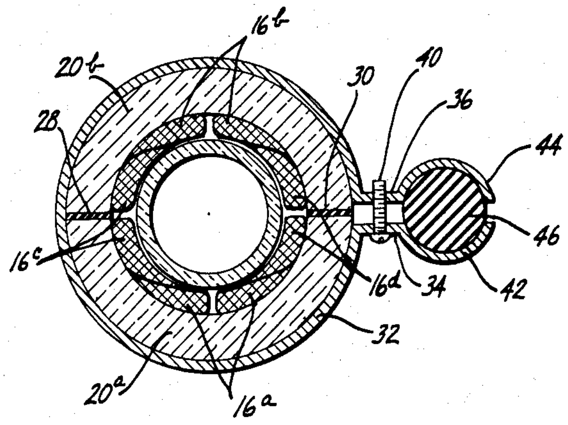
Fig. 2 is a cross-sectional view taken along the lines II—II in Fig. 1.

The two outwardly flanged ends 34 and 36 of band 32 are drawn together by a suitable fastening means represented in Figs. 1 and 2 as a screw 40. Preferably screw 40 is of non-magnetic material.

Portions 34 and 36 of band 32 are formed with complementary semi-cylindrical portions 42 and 44 to receive a cylindrical magnet 46 therebetween. Magnet 46 is magnetized along a diameter thereof. Portions 42 and 44 of band 32 hold magnet 46 with sufficient friction to prevent accidental displacement of magnet 46 either in rotation or longitudinally from between flange portions 42 and 44. Preferably the friction magnet 46 and flange portions 42 and 44 is not so great but what magnet 46 may be rotated intentionally about its axis.

As shown in Fig. 2, the gap between portions 34 and 36 of band 32 is preferably aligned with one of the gaps in core 20 formed by shim members 28 and 30.

The operation of the embodiment of Figs. 1 and 2 will now be explained by reference to Figs. 3 through 6 wherein like parts have been identified by the same reference numerals.

Figure 3:
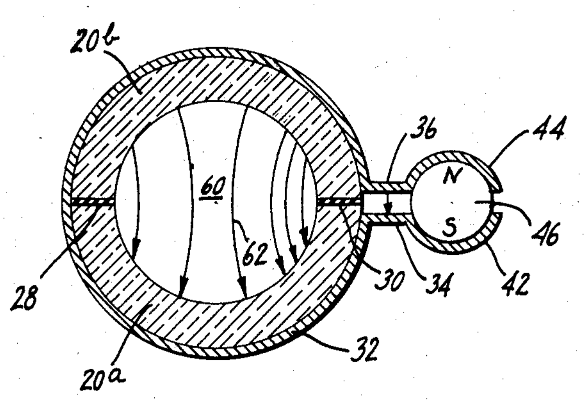
Fig. 3 is a view similar to Fig. 2 showing the flux distribution in the region inside the core which forms a part of the present invention.

As shown in Fig. 3 the flux set up by permanent magnet 46 passes down the pole pieces formed by portions 44—36 and 42—34 of band 32 to the core segments 20*b* and 20*a* respectively. A large portion of this flux will be shunted across the narrow gap formed by non-magnetic shim member 30 because of the relatively low reluctance of this gap. However, since the gap does have a measurable reluctance, some of the flux set up by magnet 46 will fringe across the space 60 between core segments 20*a* and 20*b*. This fringing flux is represented by lines 62. This fringing flux will be superimposed on the alternating flux set up by the deflection coils and will have the effect of shifting the position of the image displayed on the screen of the cathode ray tube. The direction of the displacement will be determined by the direction taken by the fringing flux 62 through space 60. The vertical flux shown in Fig. 3 would displace the cathode ray beam to the right in a horizontal plane. Reversing the position of magnet 46 so that the south pole is in contact with flange member 44 and the north pole is in contact with flange member 42 would reverse the direction of the fringing flux through space 60 and hence would reverse the direction of displacement of the electron beam passing through space 60. It is to be understood that the field set up by magnet 46 in space 60 is very weak compared to the field set up by the deflection coils. By way of example the flux represented by lines 62 may deflect the beam by one-half an inch or less while the field set up by the horizontal deflection coils may be required to deflect the beam at least 10″ from its normally undeflected position.

Figure 3A:
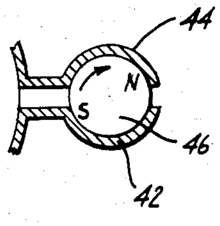
Fig. 3A is a fragmentary view showing an alternative position of adjustment for the magnet of Fig. 3.

The amount of centering control exercised by the combination shown in Fig. 3 may be reduced by rotating magnet 46 between flanges 42 and 44 as shown in Fig. 3A thereby to reduce the strength of the field across space 60. Continued rotation of magnet 46 in the direction shown by the arrow in Fig. 3A will reduce the strength of the field space 60 to zero. Still further rotation of magnet 46 will reverse the direction of the flux in space 60 with the effect described above.

Figure 6:
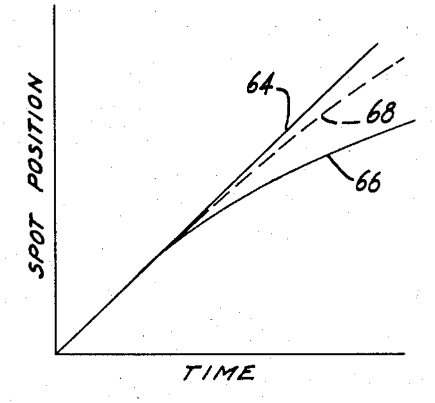

In the above discussion no mention has been made of nonlinearities which may be present in the horizontal sweep. The straight line 64 in Fig. 6 represents the ideal relationship between time and spot position measured from the left hand edge of the raster. The curve 66 represents the relationship which is normally encountered in practical sweep circuits unless corrective networks are added in the sweep generating circuit. The falling off of the curve 66 at the right hand side represents a crowding together of the right hand side of the image. Therefore an ideal centering device is one which does not displace all parts of the image equally as would be required if the sweep was truly linear. Rather it should displace the electron beam more at the right hand edge of the screen than it does at the center or left hand edge of the screen. The displacements mentioned here are the displacements due to the field of magnet 46 alone which are superimposed on the deflection produced by the horizontal deflection coils (as represented by curve 66) when the beam is deflected to different horizontal positions in the space 60. If the centering device has the characteristic that the beam is deflected more at the right hand edge of the picture than it is at the center or the left, the relationship between spot position and time will be as shown by curve 68 which is more nearly linear than curve 66.

The centering device shown in Fig. 1 has the ideal characteristic mentioned above. The position of magnet 46 adjacent to the gap formed by shim 30 causes the flux 62 to be more concentrated in the region of gap 30 than it is at the center or adjacent gap 28. This stronger permanent field in the region of gap 30, which decreases in strength toward the center of region 60, tends to stretch the right hand portion of the image and thus compensates for deficiencies in the sweep circuit. It has been found in practice that regardless of the centering error present in the undeflected tube it is generally sufficient to adjust magnet 46 and the width control of the system until the right hand and left hand edges of the picture occupy their proper position on the screen. An analysis of the position of the spot as a function of time will show that, in general, this adjustment places the center of the picture nearer the geometric center of the screen than it would be if no centering correction was supplied.

Figure 4:
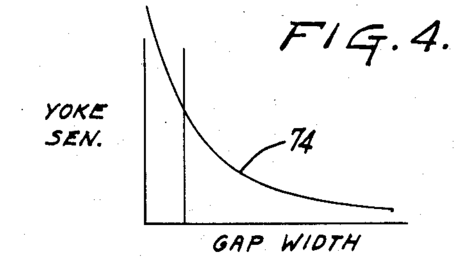
Figs. 4–6 are curves which are employed in explaining the operation of the system of Figs. 1 and 2.
Figure 5:
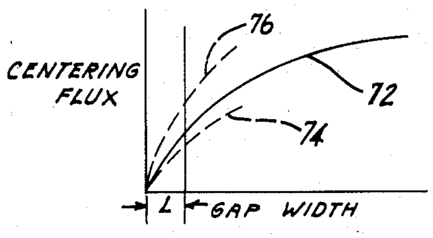

The gaps formed by shims 28 and 30 are necessary in order to produce sufficient flux in space 60 and to produce the desired gradation in flux density across space 60. In Fig. 5 curve 72 represents the change in field strength at the center of space 60 as a function of gap width for a magnet of a given effective strength. Curve 74 of Fig. 4 represents the relationship between yoke sensitivity and gap width. A decrease in yoke sensitivity will require a corresponding increase in deflection power which must be supplied to the yoke. Therefore the dimensions of gaps in the yoke will represent a practical compromise between the strength required of the permanent magnet to produce sufficient centering and the loss of sensitivity that can be tolerated. It has been found in practice that in a core having two gaps, the optimum width of each gap lies somewhere between five-thousandths of an inch and ten-thousandths of an inch.

Curves 76 and 78 in Fig. 5 illustrate the change in centering flux which can be obtained for a given gap width by rotating magnet 46. Curve 76 represents the flux produced with the magnet in the position shown in Fig. 3 while curve 74 represents the flux produced with the magnet in the position shown in Fig. 3A.

The size of the gaps formed by shims 28 and 30 will have little effect on the shape of the curve 68 of Fig. 6. Increasing the width of the gap will increase the flux from magnet 46 passing through the region adjacent the gap but at the same time, increasing the width of the gap will decrease the flux in this same region by the deflection coils. It might be assumed that the bridging of the gap formed by shim 28 by the band 30 would produce a substantial decrease in the centering flux in the region 60. However it has been found in practice that the field is increased by less than 20% in region 60 by isolating strap 32 from core 20 or by forming band 32 with a non-magnetic gap in the region of the gap in core 20 provided by shim 28. The disadvantage of this slight loss in centering flux is usually more than offset by the advantage of being able to employ a continuous clamping band which does not have to be isolated from core 20. However it lies within the scope of the invention to provide a gap in band 30 in the region of the gap in core 20 formed by shim 28.

The centering device of the present invention has the advantage not shared by other permanent magnet within-the-yoke centering devices that there are negligible spot distortions introduced by adjustments of the centering device.

Figure 7:
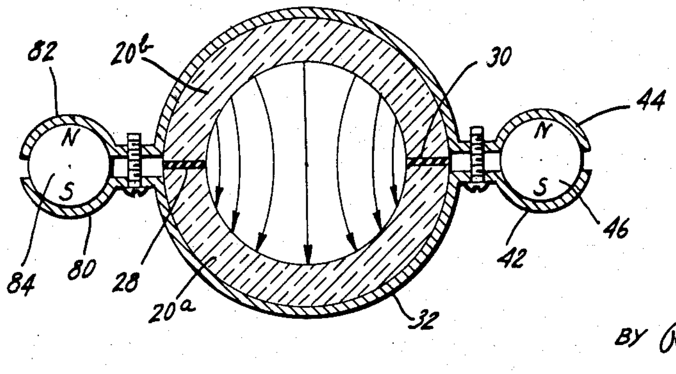
Fig. 7 is a cross-sectional view of a second preferred embodiment of the present invention.

Fig. 7 illustrates a second preferred embodiment of the invention which employs two gaps in band 32 each of which is bridged by a permanent magnet. Parts in Fig. 7 corresponding to similar parts in Fig. 2 have been identified by the same reference numeral. Flanged portions 80 and 82 are formed in the same manner as flange members 42 and 44. Magnet 84 may be similar to magnet 46.

The operation of the embodiment shown in Fig. 7 is very similar to that of the embodiment shown in Figs. 1 and 2. The embodiment of Fig. 7 has the advantage that it gives more flexible control of the flux distribution across the space 60. For example a given amount of centering flux at the center of space 60 can be realized by placing magnet 46 in a position to supply maximum flux to band 32 and at the same time setting magnet 84 to supply no flux to band 32. In this case the field will be concentrated in the region of the gap formed by shim 30. Alternatively magnet 84 may be set to provide maximum flux while magnet 46 provides zero flux, thus concentrating the field in the region of the gap formed by shim 28. A different distribution may be obtained with each of magnets 46 and 84 contributing part of the flux. Magnets 46 and 84 may be set so that they aid each other or oppose each other depending upon the degree and direction of centering correction and linearity correction desired.

The present invention has been described as a means for providing horizontal centering. It should be obvious that it may be employed instead to provide vertical centering. Alternatively the yoke 20 and the associated beam centering means may be rotated about the axis of the cathode ray tube to provide centering in any selected radial direction. Obviously core 20 may be formed of more than two segments and if two segments are employed they will not of necessity be of equal size. Magnets 46 and 84 are shown as being rotatable about an axis parallel to the axis of the cathode ray tube. It would be possible to form flanges 42 and 44 and 80 and 82 so that one or more of the magnets rotates about an axis perpendicular to the axis of the cathode ray tube. Substantially the same change in flux would result from the rotation of the magnets about such a perpendicular axis. The arrangement shown in Fig. 1 is preferred however because of the ease with which this combination may be assembled and adjusted. Obviously means other than shims 28 and 30 may be employed to provide gaps in yoke 20.

While the invention has been described with reference to the preferred embodiments thereof, it will be apparent that various modifications and other embodiments thereof will occur to those skilled in the art within the scope of the invention. Accordingly we desire the scope of our invention to be limited only by the appended claims.

What is claimed is:

1. In a deflection yoke assembly for a cathode ray tube, said assembly including deflection coils arranged in pairs about an axis, the combination comprising a ring-like core of magnetic material surrounding said coils in a plane transverse to said axis, means for maintaining said core being formed of at least two segments, the ends of said segments in a spaced apart relationship thereby to form finite, non-magnetic gaps between said segments, a band of magnetizable material disposed in direct peripheral contact with said core, said band being formed with a gap therein aligned with one of said gaps in said core, and a permanent magnet bridging said gap in said band.

2. The combination of claim 1 wherein said band is formed with a second gap therein in axial alignment with a second gap in said core.

3. The combination of claim 2 wherein said second gap in said band is bridged by a second permanent magnet.

4. In a deflection yoke assembly for a cathode ray tube, said assembly including deflection coils disposed about an axis, the combination comprising a ring-like core of magnetic material surrounding said coils in a plane transverse to said axis, said core being formed of two semi-cylindrical segments, means for maintaining the ends of said segments in a spaced apart relationship to form two gaps at diametrically opposed points on said core, a band of magnetic material disposed in direct peripheral contact with said core segments, said band being formed with outwardly turned flange portions defining two gaps in said band, said gaps in said band being disposed in alignment with said two gaps in said core, means operatively associated with said flange portions for maintaining said band in clamping engagement with said core segments, at least one of said flange portions being formed with complementary cylindrical portions, and a cylindrical permanent magnet disposed within and supported by said semi-cylindrical shaped portions of said band, said magnet being magnetized along a diameter.

5. The combination of claim 4 wherein said flange portions at each of said gaps in said band are formed with complementary semi-cylindrical portions, and wherein a cylindrical permanent magnet is disposed within and supported by said semicylindrical shaped portions of said band at each of said gaps, each of said magnets being magnetized along a diameter.

6. In a deflection yoke assembly for a cathode ray tube, said yoke assembly including deflection coils arranged in pairs about an axis, the combination comprising a ring-like core of magnetic material surrounding said coils in a plane transverse to said axis, said core being formed with at least one gap therein, means associated with said core for maintaining a finite spacing between the portions of said core bordering on said gap, a band of magnetizable material surrounding and physically contacting said core, said band being formed with a gap therein coincident with said gap in said core, and a permanent magnet bridging said gap in said band.

7. The combination of claim 1 wherein said band is continuous except for said one gap.

References Cited in the file of this patent

UNITED STATES PATENTS

| | | |
|---|---|---|
| 2,717,323 | Clay | Sept. 6, 1955 |
| 2,793,311 | Thomas | May 21, 1957 |
| 2,813,212 | Grundmann | Nov. 12, 1957 |
| 2,817,782 | Over | Dec. 24, 1957 |

FOREIGN PATENTS

| | | |
|---|---|---|
| 476,947 | Great Britain | Dec. 20, 1937 |
| 535,477 | Great Britain | Apr. 10, 1941 |
| 776,515 | Great Britain | June 5, 1957 |

UNITED STATES PATENT OFFICE
CERTIFICATE OF CORRECTION

Patent No. 2,963,609 December 6, 1960

Roy S. Fisher et al.

It is hereby certified that error appears in the above numbered patent requiring correction and that the said Letters Patent should read as corrected below.

Column 5, line 52, strike out "said core being formed of at least two segments," and insert the same after "axis," in line 51, same column.

Signed and sealed this 3rd day of October 1961.

(SEAL)
Attest:

ERNEST W. SWIDER
Attesting Officer

DAVID L. LADD
Commissioner of Patents

USCOMM-DC